United States Patent
Warren

(10) Patent No.: US 11,343,860 B1
(45) Date of Patent: May 24, 2022

(54) DEDICATED WIRELESS NETWORK FOR SECURITY AND AUTOMATION SYSTEM

(71) Applicant: Vivint, Inc., Provo, UT (US)

(72) Inventor: Jeremy B. Warren, Draper, UT (US)

(73) Assignee: VIVINT, INC., Provo, UT (US)

( * ) Notice: Subject to any disclaimer, the term of this patent is extended or adjusted under 35 U.S.C. 154(b) by 65 days.

(21) Appl. No.: 16/653,325

(22) Filed: Oct. 15, 2019

Related U.S. Application Data

(63) Continuation of application No. 15/634,624, filed on Jun. 27, 2017, now Pat. No. 10,448,434.

(51) Int. Cl.
| | |
|---|---|
| *H04W 76/10* | (2018.01) |
| *H04W 72/12* | (2009.01) |
| *H04W 4/80* | (2018.01) |
| *H04W 12/08* | (2021.01) |
| *H04W 88/08* | (2009.01) |

(52) U.S. Cl.
CPC ............ *H04W 76/10* (2018.02); *H04W 4/80* (2018.02); *H04W 12/08* (2013.01); *H04W 72/12* (2013.01); *H04W 88/08* (2013.01)

(58) Field of Classification Search
CPC ....... H04W 76/10; H04W 4/80; H04W 72/12; H04W 12/08; H04W 88/08
See application file for complete search history.

(56) References Cited

U.S. PATENT DOCUMENTS

| 9,001,659 B2 | 4/2015 | Sun et al. | |
|---|---|---|---|
| 2005/0188211 A1* | 8/2005 | Scott .................. | H04W 12/088 713/183 |
| 2009/0054033 A1* | 2/2009 | Pratt, Jr ............ | H04W 56/0015 455/410 |
| 2013/0318343 A1* | 11/2013 | Bjarnason ............... | H04L 63/08 713/157 |
| 2014/0126425 A1 | 5/2014 | Burd et al. | |
| 2014/0269660 A1 | 9/2014 | Dunn et al. | |
| 2015/0381633 A1* | 12/2015 | Grim ...................... | H04L 63/08 726/4 |
| 2016/0180620 A1* | 6/2016 | Eyring ............... | G07C 9/00309 235/382 |

(Continued)

FOREIGN PATENT DOCUMENTS

| WO | 2014183171 A1 | 11/2014 |
|---|---|---|
| WO | 2015192174 A1 | 12/2015 |

*Primary Examiner* — Dady Chery
(74) *Attorney, Agent, or Firm* — Kunzler Bean & Adamson, PC

(57) ABSTRACT

Techniques are described herein for establishing two wireless networks at a premises, a dedicated network configured to be used by devices of an automation and security system of the premises and a user network configured to be used by devices associated with users. The dedicated network may be more rigorously secured than the user network. The dedicated network may be secured in such a way that computing devices associated with users are not permitted to access the dedicated network. In this manner, the dedicated network may be prevented from becoming compromised. In some examples, a contention management entity may mediate network traffic scheduling between the dedicated network and the user network. The dedicated network may be configured to give deference to traffic being communicated across the user network to maintain a quality of service for end users of the user network.

20 Claims, 9 Drawing Sheets

(56) References Cited

U.S. PATENT DOCUMENTS

2016/0192203 A1    6/2016   Gokturk et al.
2016/0267773 A1    9/2016   Martin
2017/0036771 A1    2/2017   Woodman et al.

* cited by examiner

DEDICATED WIRELESS NETWORK FOR SECURITY AND AUTOMATION SYSTEM

CROSS-REFERENCE TO RELATED APPLICATIONS

The present application is a continuation of U.S. patent application Ser. No. 15/634,624, filed Jun. 27, 2017, titled "DEDICATED WIRELESS NETWORK FOR SECURITY AND AUTOMATION SYSTEM," and assigned to the assignee hereof, the disclosure of which is expressly incorporated herein in its entirety by this reference

BACKGROUND

The present disclosure, for example, relates to security and/or automation systems, and more particularly to dedicated wireless network for security and automation system.

Security and automation systems are widely deployed to provide various types of communication and functional features such as monitoring, communication, notification, and/or others. These systems may be capable of supporting communication with a user through a communication connection or a system management action.

Many premises include security and automation systems that may include a plurality of devices on the premises connected to the internet. These devices may convey sensitive information (e.g., camera feeds) across a Wi-Fi network associated with the premises. Some users provide access to their Wi-Fi network to a wide-ranging number of family, friends, and acquaintances. Access by these many different individuals may expose the home Wi-Fi network to being compromised by hackers.

SUMMARY

Two wireless networks may be established at a premises, a dedicated network configured to be used by devices of an automation and security system of the premises and a user network configured to be used by devices associated with users. The dedicated network may be more rigorously secured than the user network. In some examples, a contention management entity may mediate network traffic scheduling between the dedicated network and the user network. The dedicated network may be configured to give deference to traffic being communicated across the user network to maintain a quality of service for end users of the user network.

In one embodiment, a device or system may include a control panel of a security and automation system associated with a premise, a first access point coupled to the control panel, the first access point configured to establish a first wireless network dedicated exclusively to communications of the security and automation system, a plurality of devices of the security and automation system positioned at various locations of the premise, the plurality of devices configured to communicate data with the control panel using the first wireless network established by the first access point, and a second access point configured to establish a second wireless network exclusive of communications between the plurality of devices and the control panel.

In some examples of the device or system described above, the first access point uses a first security protocol that may be more strict than a second security protocol used by the second access point.

In some examples of the device or system described above, the first access point may be operable in: a first mode configured to establish communication links between the first access point and the plurality of devices. Some examples of the device or system described above may also include a second mode configured to communicate data between the first access point and the plurality of devices with established communication links.

In some examples of the device or system described above, the first access point establishes communication links with a device based at least in part on the device being included on a list of approved entities maintained by the first access point.

In some examples of the device or system described above, the first access point further comprises: a near-field network to establish communication links between the first access point and the plurality of devices.

In some examples of the device or system described above, the first access point further comprises: communication circuitry configured to establish a communication link using a cellular radio access technology.

In some examples of the device or system described above, the first access point may be integrated a same housing as the control panel.

In some examples of the device or system described above, the first access point may be integrated into a same housing as the second access point.

In some examples of the device or system described above, the plurality of devices communicate data using exclusively the first wireless network without establishing communication links with the second wireless network.

In some examples of the device or system described above, the second access point may be dedicated to establishing communication links for remote computing devices associated with occupants of the premise.

In some examples of the device or system described above, the first wireless network may be invisible to network devices not included on a list of approved device.

Some examples of the device or system described above may also include an data storage device configured to receive data from the plurality of devices using the first wireless network, wherein the data storage device may be isolated from the second wireless network.

In some examples of the device or system described above, the first access point may be configured to schedule wireless resources to communicate data based at least in part on a network usage parameter associated with the second access point.

In some examples of the device or system described above, the first wireless network and the second wireless network operate using a same radio access technology.

A method by a first access point is described. The method may include establishing a first wireless network at a premise dedicated exclusively to communicate data of a security and automation system, identifying a network traffic parameter of a second wireless network different from the first wireless network, the second wireless network located at the premise and configured to communicate data for remote computing devices associated with occupants of the premise, and refraining from scheduling communications for the security and automation system based at least in part on the network traffic parameter of the second wireless network satisfying a threshold.

An apparatus is described. The apparatus may include means for establishing a first wireless network at a premise dedicated exclusively to communicate data of a security and automation system, means for identifying a network traffic parameter of a second wireless network different from the first wireless network, the second wireless network located at the premise and configured to communicate data for remote computing devices associated with occupants of the premise, and means for refraining from scheduling communications for the security and automation system based at least in part on the network traffic parameter of the second wireless network satisfying a threshold.

Another apparatus is described. The apparatus may include a processor, memory in electronic communication with the processor, and instructions stored in the memory. The instructions may be operable to cause the processor to establish a first wireless network at a premise dedicated exclusively to communicate data of a security and automation system, identify a network traffic parameter of a second wireless network different from the first wireless network, the second wireless network located at the premise and configured to communicate data for remote computing devices associated with occupants of the premise, and refrain from scheduling communications for the security and automation system based at least in part on the network traffic parameter of the second wireless network satisfying a threshold.

A non-transitory computer readable medium by a first access point is described. The non-transitory computer-readable medium may include instructions operable to cause a processor to establish a first wireless network at a premise dedicated exclusively to communicate data of a security and automation system, identify a network traffic parameter of a second wireless network different from the first wireless network, the second wireless network located at the premise and configured to communicate data for remote computing devices associated with occupants of the premise, and refrain from scheduling communications for the security and automation system based at least in part on the network traffic parameter of the second wireless network satisfying a threshold.

Some examples of the method, apparatus, and non-transitory computer-readable medium described above may further include processes, features, means, or instructions for measuring a signal parameter of a frequency spectrum band associated with the second wireless network, wherein identifying the network traffic parameter may be based at least in part on the signal parameter.

Some examples of the method, apparatus, and non-transitory computer-readable medium described above may further include processes, features, means, or instructions for receiving a message from a second access point that establishes the second wireless network, the message including information about usage of the second wireless network, wherein identifying the network traffic parameter may be based at least in part on the message.

Some examples of the method, apparatus, and non-transitory computer-readable medium described above may further include processes, features, means, or instructions for receiving a scheduling request from a device of the security and automation system, the scheduling request including information regarding data to be transmitted from the device. Some examples of the method, apparatus, and non-transitory computer-readable medium described above may further include processes, features, means, or instructions for determining a type of the data to be transmitted based at least in part on the information included in the scheduling request, wherein refraining from scheduling communications may be based at least in part on the type of the data.

Some examples of the method, apparatus, and non-transitory computer-readable medium described above may further include processes, features, means, or instructions for identifying a user-established time period associated with expected use of the second wireless network, wherein refraining from scheduling communications may be based at least in part on the user-established time period.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Techniques are described herein for establishing two networks at a premises, a dedicated network configured to be used by devices of an automation and security system of the premises and a user network configured to be used by devices associated with users. The dedicated network may be established by a dedicated access point (AP). The dedicated network may be more rigorously secured than the user network. The dedicated network may be secured in such a way that computing devices associated with users are not permitted to access the dedicated network. In this manner, the dedicated network may be prevented from becoming compromised. In some examples, a contention management entity may mediate network traffic scheduling between the dedicated network and the user network. The dedicated network may be configured to give deference to traffic being communicated across the user network to maintain a quality of service for end users of the user network.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
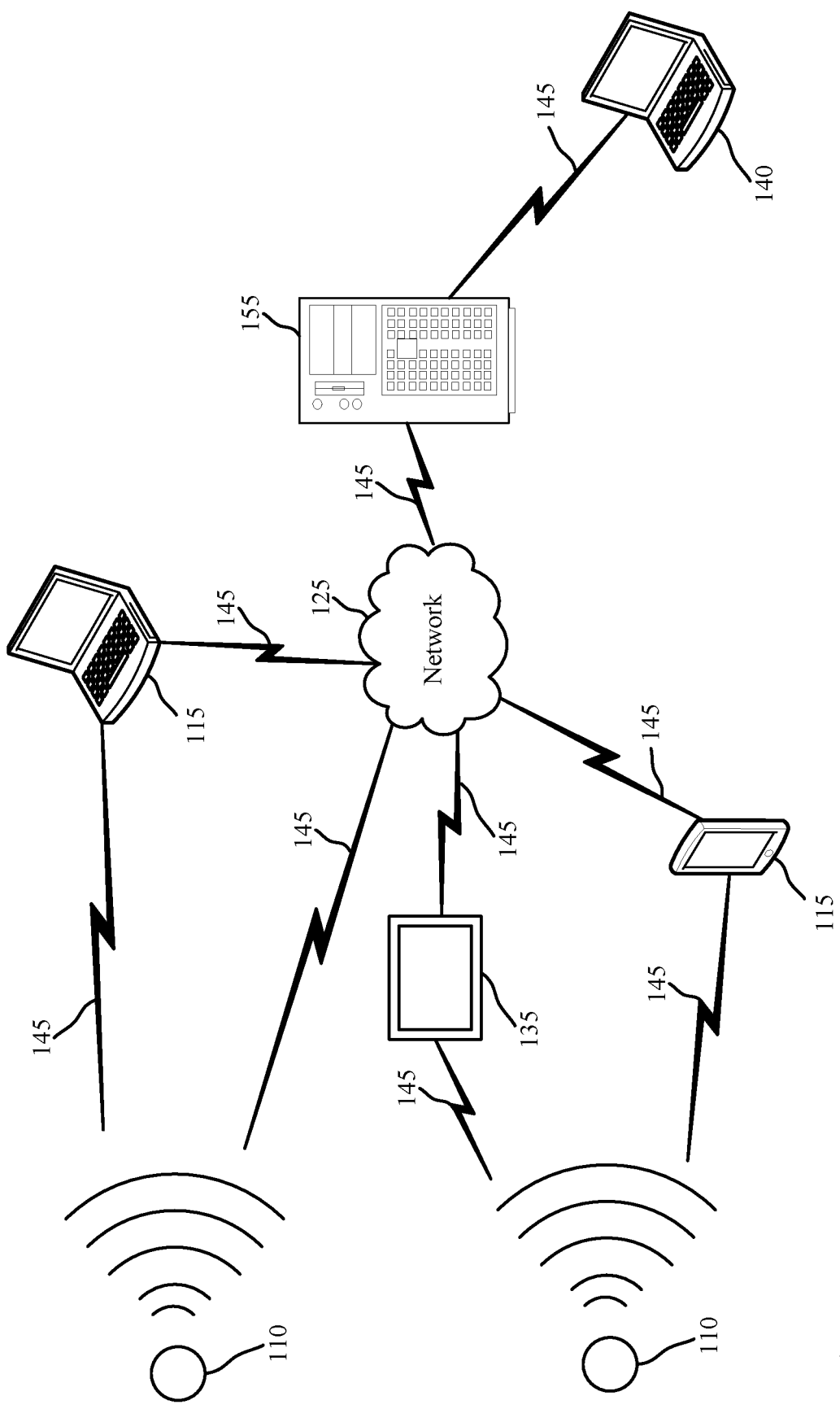
FIG. 1 illustrates an example of an automation and security system that supports dedicated wireless network for security and automation system in accordance with aspects of the present disclosure.

FIG. 1 is an example of a communications system 100 in accordance with various aspects of the disclosure. In some embodiments, the communications system 100 may include one or more sensor units 110, local computing device 115, network 125, server 155, control panel 135, and remote computing device 140. One or more sensor units 110 may communicate via wired or wireless communication links 145 with one or more of the local computing devices 115 or network 125. The network 125 may communicate via wired or wireless communication links 145 with the control panel 135 and the remote computing device 140 via server 155. In alternate embodiments, the network 125 may be integrated with any one of the local computing devices 115, server 155, or remote computing device 140, such that separate components are not required.

Local computing device 115 and remote computing device 140 may be custom computing entities configured to interact with sensor units 110 via network 125, and in some embodiments, via server 155. In other embodiments, local computing device 115 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115 and network 125, or may receive data via remote computing device 140, server 155, and network 125.

The local computing devices 115 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115 may be operable to control operation of the output of the local computing devices 115. The output may be a television, a liquid crystal display (LCD) monitor, a cathode ray tube (CRT) monitor, speaker, tactile output device, and/or the like. In some embodiments, the output may be an integral component of the local computing devices 115. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115 to the output.

The remote computing device 140 may be a computing entity operable to enable a remote user to monitor the output of the sensor units 110. The remote computing device 140 may be functionally and/or structurally similar to the local computing devices 115 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automatic measurements related to network traffic management. In other embodiments, the one or more sensor units 110 may be related to automation and/or security functions of the automation and security system. Each sensor unit 110 may be capable of sensing multiple network parameters, or alternatively, separate sensor units 110 may monitor separate network parameters. For example, one sensor unit 110 may measure network traffic parameters, while another sensor unit 110 (or, in some embodiments, the same sensor unit 110) may detect different traffic parameters. Sensor units 110 may monitor a variety of network traffic parameters, such as received signal strength indicator, received quality indicators, and the like. In alternate embodiments, a user may input traffic parameters or schedule data directly at the local computing device 115 or at remote computing device 140. For example, a user may enter traffic schedule data into a dedicated application on his smart phone.

Data gathered by the one or more sensor units 110 may be communicated to local computing device 115, which may be, in some embodiments, a thermostat or other wall-mounted input/output smart home display. In other embodiments, local computing device 115 may be a personal computer or smart phone. Where local computing device 115 is a smart phone, the smart phone may have a dedicated application directed to collecting network traffic data and calculating network traffic parameters therefrom. The local computing device 115 may process the data received from the one or more sensor units 110 to obtain network traffic data. In alternate embodiments, remote computing device 140 may process the data received from the one or more sensor units 110, via network 125 and server 155, to obtain network traffic data. Data transmission may occur via, for example, frequencies appropriate for a personal area network (such as BLUETOOTH® or IR communications) or local or wide area network frequencies such as radio frequencies specified by the Institute of Electrical and Electronics Engineers (IEEE) 802.15.4 standard.

In some embodiments, local computing device 115 may communicate with remote computing device 140 or control panel 135 via network 125 and server 155. Examples of networks 125 include cloud networks, LANs, WANs, virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115 from remote computing device 140. For example, in some embodiments, remote computing device 140 may include a mobile application that interfaces with one or more functions of local computing device 115.

The server 155 may be configured to communicate with the sensor units 110, the local computing devices 115, the remote computing device 140 and control panel 135. The server 155 may perform additional processing on signals received from the sensor units 110 or local computing devices 115, or may simply forward the received information to the remote computing device 140 and control panel 135.

Server 155 may be a computing device operable to receive data streams (e.g., from sensor units 110 and/or local computing device 115 or remote computing device 140), store and/or process data, and/or transmit data and/or data summaries (e.g., to remote computing device 140). For example, server 155 may receive a stream of network traffic data from a sensor unit 110. In some embodiments, server 155 may "pull" the data streams, e.g., by querying the sensor units 110, the local computing devices 115, and/or the control panel 135. In some embodiments, the data streams may be "pushed" from the sensor units 110 and/or the local computing devices 115 to the server 155. For example, the sensor units 110 and/or the local computing device 115 may be configured to transmit data as it is generated by or entered into that device. In some instances, the sensor units 110 and/or the local computing devices 115 may periodically transmit data (e.g., as a block of data or as one or more data points).

The server 155 may include a database (e.g., in memory) containing network traffic data or schedule data received from the sensor units 110 and/or the local computing devices 115. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
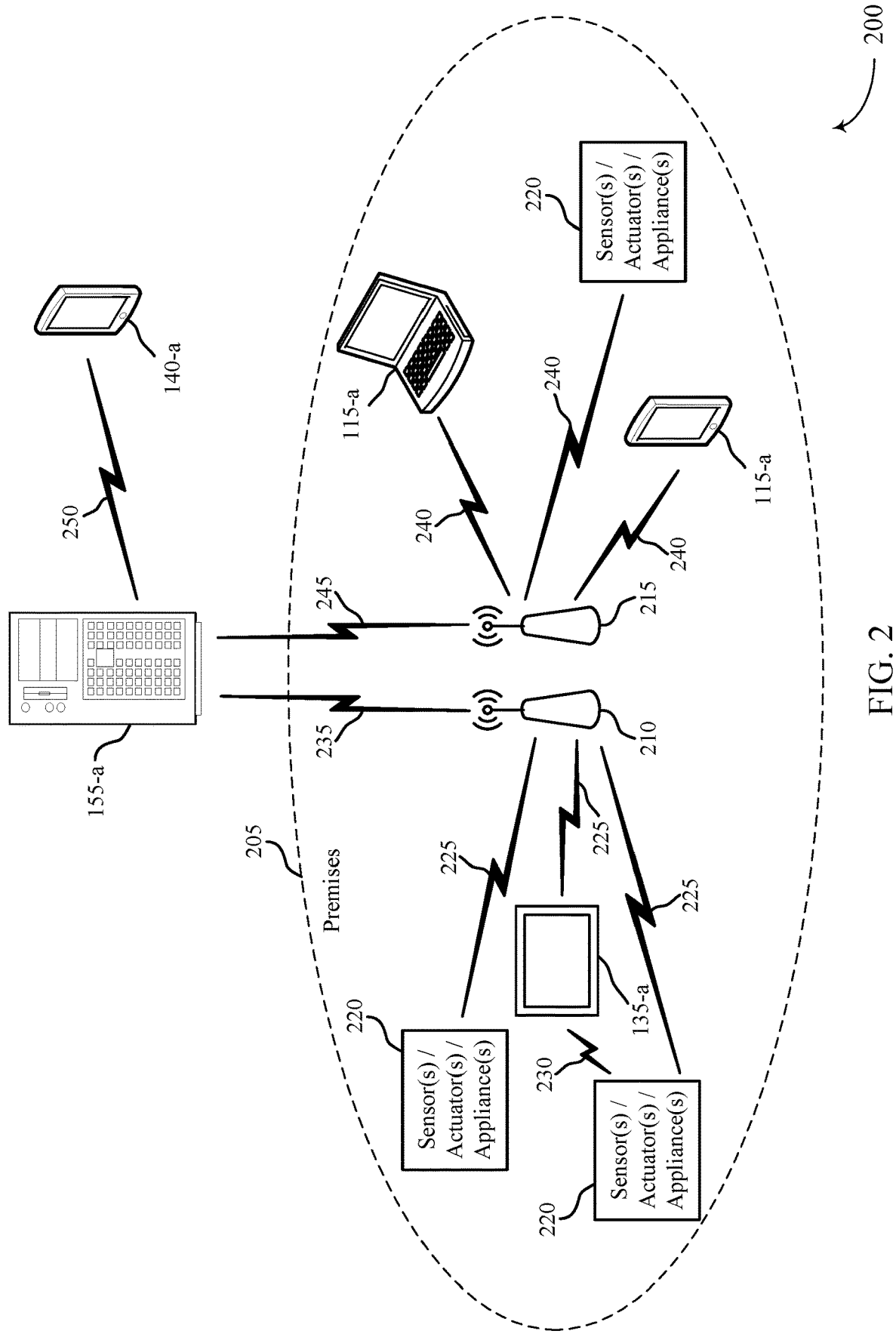
FIG. 2 illustrates an example of a system that supports dedicated wireless network for security and automation system in accordance with aspects of the present disclosure.

FIG. 2 illustrates an example of a system 200 that supports dedicated wireless network for security and automation system in accordance with various aspects of the present disclosure. The system 200 may be associated with a particular premises 205. A premises 205 may include a building, a home, a business, or the like with the land associated with the building and any outbuildings on the land. The system 200 may include two access points 210, 215 for communicating data via a network: a dedicated access point 210 (dedicated AP 210) dedicated to communicated data of an automation and security system of the premises 205 and a user access point 215 (user AP 215) configured to communicate data for devices that are not connected to the dedicated AP 210.

The system 200 may include an automation and security system installed on the premises 205. The automation and security system may include a control panel 135-$a$, sensor(s), actuator(s), appliance(s) (shown collectively as devices 220), or combinations thereof. In some examples, the automation and security system may also include the dedicated AP 210. In other examples, the dedicated AP 210 may be a third-party access point that is designed specifically for use with the automation and security system.

The automation and security system may be configured to manage (e.g., control) various automation procedures or security procedures associated with the premises 205. The automation and security system may manage one or more appliances located at the premises 205. For example, some of the appliances that may be managed by the automation and security system may include lighting systems, heating, ventilation, and air conditioning (HVAC) systems, thermostat(s), door locks, garage doors, power systems, plumbing systems, network-enabled devices positioned at the premises 205 (e.g., TVs, monitors, ovens, dishwashers, washers, dryers, fans, refrigerators, ovens, ranges, fireplaces, water softeners, manufacturing equipment, cleaning systems, vacuum systems, etc.), or combinations thereof.

To manage the automation procedures and the associated appliances, the automation and security system may use one or more sensors and/or actuators. In some examples, the sensors and/or actuators may be integrated into the managed appliances themselves. In other examples, the sensors and/or actuators may be separate from the managed appliances. In yet other examples, the automation and security system may use a combination of integrated devices and separate devices to control appliances at the premises 205. Sensors of the automation and security system may include cameras, microphones, infrared sensors, heat sensors, motion sensors, pressure sensors, climate sensors, light sensors, proximity sensors, gas sensors, temperature sensors, smoke detectors, carbon monoxide detectors, precipitation sensors, moisture sensors, location sensors (e.g., global positioning system (GPS) devices), or combinations thereof. Actuators of the automation and security system may include electric motors, hydraulic actuators, electric actuators, or combinations thereof.

The automation and security system may be configured to manage (e.g., control) various security procedures associated with the premises 205. For example, the automation and security system may be configured to collect security information (e.g., video feeds and other sensor data) related to the premises 205, correlate the data, and present the information to the user. The security procedures of the automation and security system may include detecting unwanted intruders, detecting persons at the premises 205, detecting emergency response situations (e.g., fire, flood, medical emergency), detecting other events, or combinations thereof. To identify these various security events, the automation and security system may receive data from one or more of the sensors of the automation and security system.

The automation and security system may manage large amounts of sensitive data of the users of the premises 205. For example, if the premises 205 is a home, the automation and security system may manage large amounts of personal that may be misused by others. Such data may include personally identifying information, information about various habits of users, etc. In addition to potential misuse of data, the automation and security system may communicate large amounts of data across a network that may cause network congestion. For example, cameras of automation and security system may transmit large amounts of data over a wireless network to a centralized hub (e.g., the control panel 135-a).

To address issues regarding security and/or network congestion, the system 200 for the premises 205 may include two APs: a dedicated AP 210 configured to establish a wireless local area network (WLAN) dedicated to various devices 220 of the automation and security system and a user AP 215 configured to establish a WLAN for a broader assortment of devices.

The dedicated AP 210 may implement more strict security protocols than the user AP 215, in some cases. The strict security protocols of the dedicated AP 210 may be used to prevent network data from becoming compromised by hackers, unwanted observation, or from being intercepted by unwanted individuals. The strict security protocols of the dedicated AP 210 also may be used to prevent devices 220 of the automation and security system from becoming compromised by hackers or other entities.

The dedicated AP 210 may implement different security protocols or combinations of different security protocols. For instance, the security protocols of the dedicated AP 210 may include password procedures, encryption procedures, encoding procedures, white list procedures, physical authentication procedures, visibility procedures, or combinations thereof. In some examples, the control panel 135-a may implement part or all of these security protocols discussed.

In some examples, the dedicated AP 210 may implement security protocols using a white list of devices. The white list of devices may specify which devices may establish communication links with the dedicated AP 210. Devices that are not on the white list may not be permitted to establish communication links with the dedicated AP 210. Security protocols that use white lists may prevent unwanted devices (e.g., devices used to hack a network) from connecting to the dedicated AP 210. In some cases, a user may be configured to add devices to the white list using a computer interface. In some cases, the dedicated AP 210 may come preconfigured with a white list that includes devices 220 of the automation and security system. In some cases, the control panel 135-a may maintain the white list associated with the dedicated AP 210.

In some examples, the dedicated AP 210 may implement security procedure using physical authentication. Physical authentication may refer to protocols that require the physical presence of the device to establish a communication link. An example of a physical authentication procedure may include establishing a communication link or authenticating a device using near-field communications. In such examples, the dedicated AP 210 (or the control panel 135-a as the case may be) and the device 220 may both include near-field transceivers. For the dedicated AP 210 to recognize that the device 220 is an authorized device, the two entities may first have to execute an authentication procedure using near-field communications. In other cases, physical authentication may include putting both entities into a discovery mode by physically pressing button(s) on one or more of the entities. As such, hackers at a location remote from the premises 205 may not be able to add a device to the dedicated AP 210. Physical authentication procedures may be used with the white list procedures, in some instances.

In some examples, the dedicated AP 210 may be invisible to other computing devices until the device has been authenticated in some way. Meaning that non-authenticated computing devices may not indicate to a user (e.g., by a graphic user interface) that the network produced by the dedicated AP 210 even exists. Such measures may prevent hackers from even recognizing the presence of the dedicated AP 210.

Public networks open to a large amount of devices are the most vulnerable to being comprised by hackers. For example, some people have had information stolen while using WLANs at coffee shops, airports, and other public places. Sometimes, however, people may desire more open access to some networks to accomplish certain tasks. In some instances, a user AP 215 may be configured to establish communication links with a larger amount of devices than the dedicated AP 210. For example, if the premises is a coffee shop, patrons may be permitted to establish communication links with the user AP 215, while they are not permitted to establish communication links to a dedicated AP 210 at the coffee shop. Such limited access to the dedicated AP 210 may reduce opportunities for the network generated by the dedicated AP 210 from being compromised.

In some instances, the dedicated AP 210 may be configured such that the dedicated AP 210 does not establish communication links with devices that are not part of the automation and security system. As such, the dedicated AP 210 may be exclusive of communication links to other devices. Such other devices may include personal computing devices that are configured to provide a user access to content. In some examples, the devices connected to the dedicated AP 210 may be mutually exclusive from the devices connected to the user AP 215. As such, in some cases, to be connected to the dedicated AP 210 a device may indicate that it is not connected to the user AP 215. In some examples, the dedicated AP 210 and the user AP 215 may share a common communication link to the server 155-a. For example, a home may be configured with a single internet service provider. As such, both the dedicated AP 210 and the user AP 215 may connect to the server 155-a via the single internet service provider.

The dedicated AP 210 may implement traffic management procedures or combinations of different traffic management procedures. At different times during a day, the data demands of users at the premises 205 may fluctuate. For example, data demands at a home may be greatest in the evening after users have returned from work, school, or other pursuits. In another example, data demands at a business may be greatest during business hours. To ensure that a user's quality of service at personal computing devices is maintained, the dedicated AP 210 (or the control panel 135-a as the case may be) may execute traffic management procedures with its connected devices 220. To maintain the quality of service for users, the dedicated AP 210 may defer communicating some network traffic until a time when the traffic on the network generated by the user AP 215 is less. In some examples, the control panel 135-a may implement part or all of these traffic management procedures described herein.

In some examples, the APs 210, 215 may establish a master-slave relationship, wherein one AP control when the other AP is permitted to communicate data. For example, a user AP 215 may identify a network congestion parameter for its network that services personal computing devices of users. Based on the network congestion parameter, the user AP 215 may indicate to the dedicated AP 210 whether how much traffic it is allowed to communicate. In these examples, the APs 210, 215 may exchange control messages and/or other data between, either directly or through an intermediary entity (e.g., server 155-*a*). In some examples, the control panel 135-*a* may communicate with the user AP 215 (or some related device) rather than dedicated AP 210. In some examples, the control panel 135-*a* may cooperate with the dedicated AP 210 to communicate with the user AP 215.

In some examples, the dedicated AP 210 may defer scheduling traffic without exchanging signaling or messages with the AP 215. In such examples, the dedicated AP 210 may measure a network parameter of the network generated by the user AP 215. Such network parameters may include received power, various quality parameters, or combinations thereof. The dedicated AP 210 may defer scheduling some data to be communicated based on the measured network parameter of the network generated by the user AP 215. In some instances, the dedicated AP 210 may receive a scheduling request from a connected device. Based on the type of data being communicated and/or a number of other factors about the data, the dedicated AP 210 may determine whether to defer granting communication resources for the data until a later time. In some examples, the control panel 135-*a* may perform some or all of these features described above.

In some examples, the dedicated AP 210 may defer scheduling traffic based on a schedule. For example, a user may indicate periods of time where user traffic on the user AP 215 is expected to be higher than normal. Those periods of time may be collected into a schedule. In some examples, the dedicated AP 210 may generate its own schedule for deferring traffic based on observed data. In such examples, the dedicated AP 210 may learn over time when traffic should be deferred. In some examples, the control panel 135-*a* may perform some or all of these features described above.

In some examples, the dedicated AP 210 may defer scheduling traffic based on context information received from other connected devices. For example, the control panel 135-*a* may identify that a video gaming console is operating or is communicating data with an external network. So as to not disrupt the quality of a gaming experience, the dedicated AP 210 may defer scheduling traffic because a game console is being used. Other type of context data may be received from sensors, devices, and/or appliances connected to either the dedicated AP 210 or the user AP 215. For example, the control panel 135-*a* may determine whether certain network-enabled devices are operating and may defer scheduling traffic based on such operations.

In some examples, the dedicated AP 210 may defer scheduling traffic based on context information related to end-users using the user AP 215. The dedicated AP 210 may determine (via messages or measurements) that the number of connected users to the user AP 215 exceeds a threshold. For example, a party may be being held at the premises 205. The dedicated AP 210 may defer scheduling traffic based on the number of users using the user AP 215 exceeding the threshold.

In some examples, the dedicated AP 210 may defer scheduling traffic based on context information related to network traffic loads. If the user AP 215 is experiencing a network traffic load that exceeds a threshold, the dedicated AP 210 may defer scheduling traffic. For example, the dedicated AP 210 may defer scheduling traffic based on a user may be using the user AP 215 to stream audio/visual content.

In some examples, the dedicated AP 210 may defer scheduling traffic based on context information received from other devices 220. In some instances, the context data may be received from the control panel 135-*a* or one or more computing devices 115-*a*, 140-*a*. In some examples, the dedicated AP 210 may defer scheduling traffic based on messages received from the control panel 135-*a*, the server 155-*a*, a computing device 115-*a*, 140-*a*, or other controller. In such examples, the functions of the dedicated AP 210 may be performed by another entity. For example, in some cases the control panel 135-*a* may determine whether scheduling traffic should be deferred and transmits a message to the dedicated AP 210 that includes that information.

In some examples, the dedicated AP 210 and the user AP 215 may be integrated into the same housing. A common housing may be configured to secure circuitry associated with the dedicated AP 210 and the circuitry associated with the user AP 215. The circuitry for each AP 210, 215 may be positioned such that the APs 210, 215 are isolated from one another physically, electrically, and communicatively. In some cases, the APs 210, 215 may share a common power source.

In some examples, the dedicated AP 210 may be integrated into the same housing as the control panel 135-*a*. In such examples, the dedicated AP 210 may be part of the control panel 135-*a*. In some cases, the dedicated AP 210 may share processing resources with the control panel 135-*a* (e.g., use the same processor). As such, the functions described herein may be performed by the dedicated AP 210, the control panel 135-*a*, the user AP 215, or various combinations thereof.

The APs 210, 215 may be configured to establish WLANs using a variety of radio access technologies (RATs). In some cases, the APs 210, 215 may establish WLANs that use a Wi-Fi RAT (e.g., a RAT based on the IEEE 802.11 standards). In other cases, the APs 210, 215 may establish a WLAN that uses a different RAT such as Bluetooth, cellular RATs (e.g., 3G, LTE, etc.). In some examples, the APs 210, 215 may use the same RAT. In other examples, the APs 210, 215 may use different RATs.

The dedicated AP 210 may establish communication links 225 with various components of the automation and security system such as the control panel 135-*a* and devices 220. In some instances, some devices 220 of the automation and security system may establish direct communication links 230 with each other or with the control panel 135-*a*. In some examples, the control panel 135-*a* and/or one or more devices 220 may establish distributed ad-hoc networks between themselves exclusive of a central access point managing communications in those distributed ad-hoc networks. The dedicated AP 210 may establish a communication link 235 (either wired or wireless) with the server 155-*a*. Communication links 225, 230, 235 may be examples of the communication links 145 described with reference to FIG. 1.

The user AP 215 may establish communication links 240 with one or more wireless devices 115-*a*. In some examples, the user AP 215 also may establish communication links 240 with one or more devices 220 that are part of the automation and security system at the premises 205. In some examples, the devices 220 that are connected to the user AP 215 may not be connected to the dedicated AP 210 at the same time. The user AP 215 may establish a communication link 245 (either wired or wireless) with the server 155-*a*. The server 155-*a* may establish a communication link 250 (ether wired or wireless) with a remote computing device 140-*a*. Communication links 240, 245, 250 may be examples of the communication links 145 described with reference to FIG. 1.

In some examples, the dedicated AP 210 and the user AP 215 may establish a communication link (not shown) to communicate data back and forth. In some examples, the dedicated AP 210 and the user AP 215 may not be configured to communicate directly with one another. In some examples, the dedicated AP 210 and the user AP 215 may be configured to communicate through an intermediary entity such as the server 155-*a*, for example.

The control panel 135-*a* may be configured to manage operations of the devices 220 (e.g., sensors, actuators, appliances). The control panel 135-*a* may be a wall-mounted computing device mounted on a wall of a building in the premises. The control panel 135-*a*, in other examples, may be an example of any type of computing device, including a personal computing device, a desktop computer, a laptop, a handheld computing device, a tablet, a smartphone, other type of computing device, or combinations thereof. The control panel 135-*a* may be an example of the control panel 135 described with reference to FIG. 1.

The devices 220 the automation and security system may include may be configured to perform various automation and/or security functions associated with the premises 205. For example, devices 220 may include networked-enabled cameras, sensors, actuators, switches, thermostats, home appliances, electronics, lighting, HVAC systems, fire suppression systems, lasers, proximity sensors, motion sensors, weight sensors, radio frequency (RF) transmission sensors, location sensors, microphones, or combinations thereof. In some cases, a single appliance or system may include multiple devices 220. For example, an HVAC unit may include various sensors monitoring temperatures and other conditions of the HVAC unit and actuators to control various portions of the HVAC unit. A person of ordinary skill in the art may appreciate other examples of devices integrated with systems of the premises 205.

Figure 3:
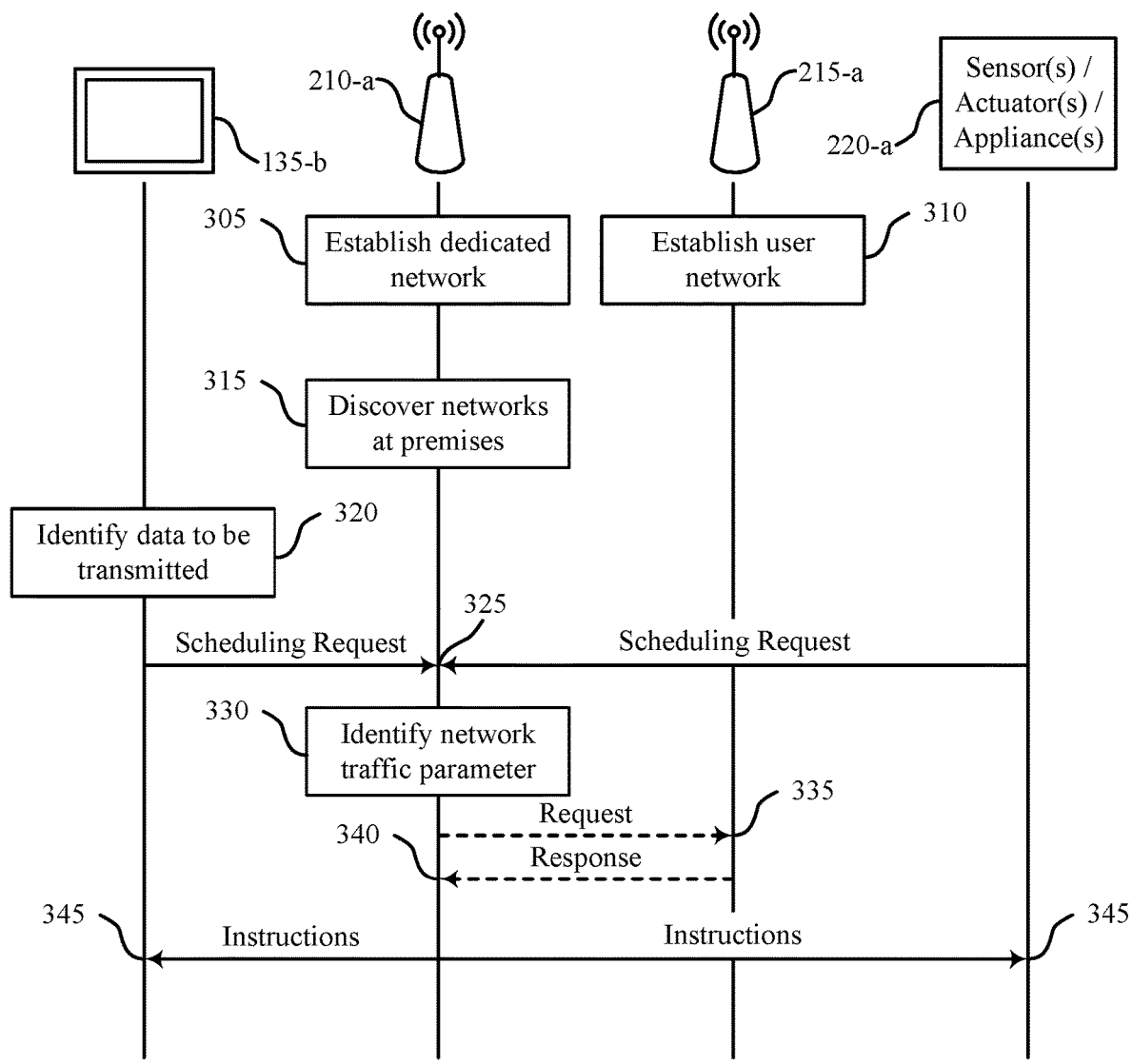
FIG. 3 illustrates an example of a communication scheme that supports dedicated wireless network for security and automation system in accordance with aspects of the present disclosure.

FIG. 3 illustrates an example of a communication scheme 300 that supports dedicated wireless network for security and automation system in accordance with various aspects of the present disclosure. The communication scheme 300 may be implemented by an example of communications system 100 or the system 200 described with reference to FIGS. 1 and 2. The communication scheme 300 illustrates functions and communications between a control panel 135-*b*, a dedicated AP 210-*a*, a user AP 215-*a*, one or more devices 220-*a*, one or more computing devices 115, 140, or combinations thereof. In some cases, the functions of one entity may be performed by another entity of the communication scheme 300. For example, some of the functions of the dedicated AP 210-*a* may be performed by the control panel 135-*b*, devices 220-*a*, or a computing device 115, 140.

The communication scheme 300 illustrates ways to manage the presence of two APs 210-*a*, 215-*a* on the same premises 205. At various times, conflicts may arise between the two networks established by the two APs 210-*a*, 215-*a* (e.g., both networks may want to communicate data using the same communication resources at the same time). The communication scheme 300 may provide one or more solutions to mediating such conflicts.

At block 305, the dedicated AP 210-*a* may establish a dedicated network dedicated to devices of an automation and security system of a premises. The dedicated network may use a variety of RATs. In some cases, the dedicated AP 210-*a* may establish a dedicated network that uses a Wi-Fi RAT (e.g., a RAT based on the IEEE 802.11 standards). In other cases, the dedicated AP 210-*a* may establish a dedicated network that uses a different RAT such as Bluetooth, cellular RATs (e.g., 3G, LTE, etc.). In some examples, the dedicated network may be established using the same RAT as the user network.

When establishing the dedicated network the dedicated AP 210-*a* may implement one or more security protocols. For example, white lists, physical authentication, pairing modes, or combinations thereof may be used to establish communication links between the dedicated AP 210-*a* and devices of the automation and security system. The security protocols may be examples of the security protocols described with reference to FIG. 2.

At block 310, the user AP 215-*a* may establish a user network that interfaces with computing devices of one or more users or occupants of a premises. The user network may use a variety of RATs. In some cases, the user AP 215-*a* may establish a user network that uses a Wi-Fi RAT (e.g., a RAT based on the IEEE 802.11 standards). In other cases, the user AP 215-*a* may establish a user network that uses a different RAT such as Bluetooth, cellular RATs (e.g., 3G, LTE, etc.). In some examples, the user network may be established using the same RAT as the dedicated network.

At block 315, the dedicated AP 210-*a* may discover other networks at the premises. To provide security and network congestion management, the dedicated AP 210-*a* may identify other networks that may contend for the same communication resources that the dedicated AP 210-*a* uses. The dedicated AP 210-*a*, or other traffic management entity (e.g., the control panel 135-*b*), may discover other networks by measuring channel characteristics, executing discovery procedures, exchanging messages, receiving information entered by a user, or combinations thereof.

In some examples, the dedicated AP 210-*a* may measure a channel characteristic of communication resources being used by the dedicated AP 210-*a* to establish the dedicated network. For example, the dedicated AP 210-*a* may measure a received signal strength for frequency spectrum bands to be used by the dedicated network.

In some examples, the dedicated AP 210-*a* may execute a discovery procedure to identify other networks at the premises. For example, the dedicated AP 210-*a* may transmit a plurality of discovery messages over a variety of frequency spectrum bands. In some cases, the discovery messages may be transmitted repeatedly over time. The dedicated AP 210-*a* may receive response messages based on the discovery messages. In some examples, the user AP 215-*a* may transmit a response messages based on successfully decoding a discovery message.

In some examples, the dedicated AP 210-*a* may receive messages from other networks indicating their presence. For example, the user AP 215-*a* may transmit messages indicating that it exists (e.g., discovery messages). The dedicated AP 210-*a* may identify the network based on receiving these messages. In some examples, the dedicated AP 210-*a* may transmit a response message based on successfully decoding a discovery message transmitted by the user AP 215-*a*.

In some examples, the dedicated AP 210-*a* may identify other networks at the premises based on information indicated by a user. For example, a user may indicate at the control panel 135-*b*, devices 220-*a*, or a computing device 115, 140 that another network is present at the premises.

At block 320, the control panel 135-*b* or other device of the automation and security system may identify data to be transmitted via the dedicated network. The control panel 135-*b* or the other device may transmit a scheduling request 325 to the dedicated AP 210-*a* requesting communication resources to transmit the data waiting to be transmitted. The scheduling request 325 may indicate the type of traffic waiting to be transmitted, the size of the traffic, a priority of the traffic, or combinations thereof.

At block 330, the dedicated AP 210-a or other network traffic management entity (e.g., the control panel 135-b) may identify a network traffic parameter for the traffic waiting to be transmitted based on the scheduling request 325. The traffic parameter indicate a relative priority of the traffic waiting to be transmitted via the dedicated network. The dedicated AP 210-a may compare the traffic parameter to a network parameter associated the user AP 215-a. The dedicated AP 210-a may schedule the traffic based on the comparison. For example, if the traffic has a low priority and the user network is congested, the dedicated AP 210-a may determine defer scheduling the traffic until a later time.

In some examples, the dedicated AP 210-a may defer scheduling the traffic based on channel characteristic measurements. Upon receiving the scheduling request 325, the dedicated AP 210-a may measure a received signal power or some other channel characteristic of frequency spectrum resources used by the user AP 215-a. The traffic may be granted communication resources by the dedicated AP 210-a based on a traffic parameter of the traffic (e.g., a traffic priority or traffic type) and the channel characteristics. The dedicated AP 210-a may determine a traffic parameter threshold based on the measured channel characteristic and then compare the traffic parameter to the traffic parameter threshold. For example, if the channel characteristic measurements indicate that the user network is congested, the dedicated AP 210-a may set the traffic parameter threshold at a high value. In such examples, only the most high-priority traffic may be granted resources. In other examples, the traffic parameter threshold may be set lower and traffic having lower traffic parameters may be granted communication resources.

In some examples, the dedicated AP 210-a may defer scheduling the traffic based on comparing the traffic parameter to a schedule defined by a user. A traffic threshold may be determined based on the schedule. If the schedule indicates that lots of users may be using the user AP 215-a, the traffic threshold may be different than when the schedule indicates that few users may be using the user AP 215-a. The schedule may be determined based on user input. For example, a user may input a schedule of times when users will likely be using the user network into a computing device 115, 140. The computing device 115, 140 may communicate the schedule to the dedicated AP 210-a, the user AP 215-a, the control panel 135-b, other devices in the automation and security system or combinations thereof. If the schedule indicates that the user network may be congested, the dedicated AP 210-a may set the threshold at a high value. In such examples, only the most high-priority traffic may be granted resources. In other examples, the threshold may be set lower and traffic having lower traffic parameters may be granted communication resources.

In some examples, the dedicated AP 210-a may defer scheduling the traffic based on information received from the user AP 215-a. The dedicated AP 210-a may transmit a request 335 to use communication resources to the user AP 215-a based on receive the scheduling request 325. The request 335 may include information about the traffic waiting to be transmitted include the amount of traffic, the type of traffic, a priority of the traffic, a traffic parameter associated with the traffic, or combinations thereof. Upon successfully decoding the request 335, the user AP 215-a may transmit a response 340 indicating whether the traffic may be granted communication resources. The user AP 215-a may determine whether the traffic may be granted communication resources based on the network traffic of the user AP 215-a, a schedule, or other types of data. In some examples, the dedicated AP 210-a and the user AP 215-a are not configured to communicate directly. As such, the request 335 and the response 340 may be communicated via an intermediate entity (e.g., server 155).

The dedicated AP 210-a may transmit instructions 345 to the control panel 135-b or one or more devices 220 of the automation and security system. The instructions 345 may be an example of a grant of communication resources to the requesting device (e.g., control panel 135-b or devices 220-a). In situations where the dedicated AP 210-a is free to schedule traffic, the dedicated AP 210-a may grant certain communication resources to the requesting device based on receiving the scheduling request 325.

In some examples, the instructions 345 may be an example of a deferred grant of communication resources. The instructions 345 may indicate a set of communication resources to use transmission that is outside of a normal time frame for granting communication resources. For example, the dedicated AP 210-a may grant communication resources that occur at the beginning of the time frame in a conflict schedule. If the user defines a schedule that indicates time frames where the user AP 215-a is be granted priority access to communication resources, the instructions 345 may include a grant of communication resources that fall outside of one of those time frames.

In some examples, the instructions 345 may include a refusal to grant communication resources and a timer value. The timer value may be configured to indicate a duration for the requesting device to retransmit a scheduling request 325. For example, upon receiving the instructions 345 with a timer, the requesting device may start a timer based on the timer value included in the instructions. After the timer expires, the requesting device may re-send the scheduling request based on the data waiting to be transmitted via the dedicated network.

In some examples, the functions of the dedicated AP 210-a may be performed by some other contention management entity, such as the control panel 135-b, a computing device 115, 140, server 155, or combinations thereof. In some cases, the control panel 135-b may be the device that mediates the contentions between the dedicated AP 210-a and the user AP 215-a.

Figure 4:
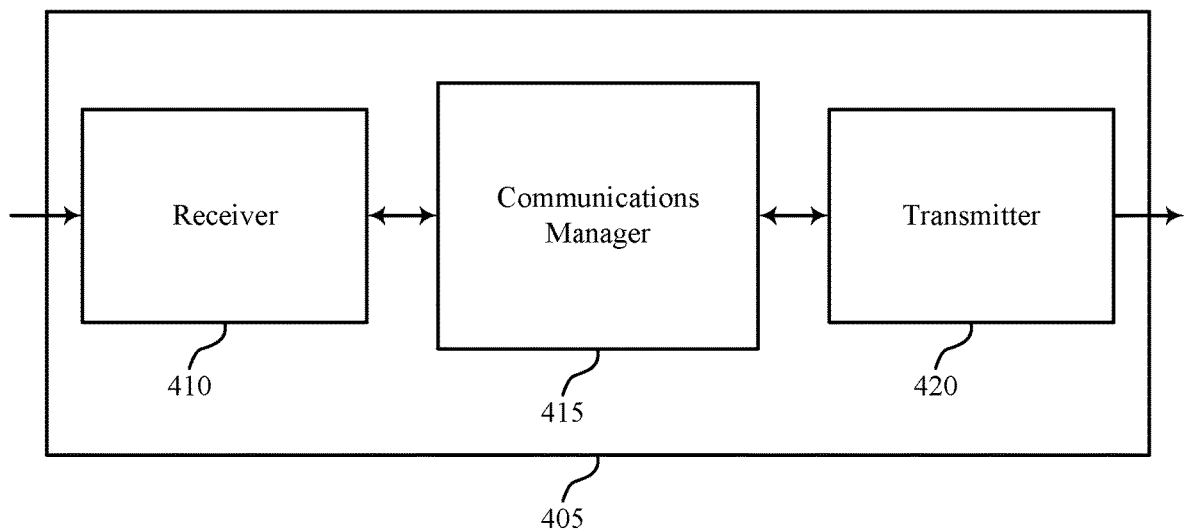
FIGS. 4 through 6 show block diagrams of a device that supports dedicated wireless network for security and automation system in accordance with aspects of the present disclosure.

FIG. 4 shows a block diagram 400 of a device 405 that supports dedicated wireless network for security and automation system in accordance with aspects of the present disclosure. Device 405 may be an example of aspects of an automation and security system as described herein. Device 405 may include receiver 410, communications manager 415, and transmitter 420. Device 405 may also include a processor. Each of these components may be in communication with one another (e.g., via one or more buses).

Receiver 410 may receive information such as packets, user data, or control information associated with various information channels (e.g., control channels, data channels, and information related to dedicated wireless network for security and automation system, etc.). Information may be passed on to other components of the device. The receiver 410 may be an example of aspects of the transceiver 735 described with reference to FIG. 7. The receiver 410 may utilize a single antenna or a set of antennas.

Communications manager 415 may be an example of aspects of the communications manager 715 described with reference to FIG. 7. Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an ASIC, an FPGA or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may establish a first wireless network at a premise dedicated exclusively to communicate data of a security and automation system, identify a network traffic parameter of a second wireless network different from the first wireless network, the second wireless network located at the premise and configured to communicate data for remote computing devices associated with occupants of the premise, and refrain from scheduling communications for the security and automation system based on the network traffic parameter of the second wireless network satisfying a threshold.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
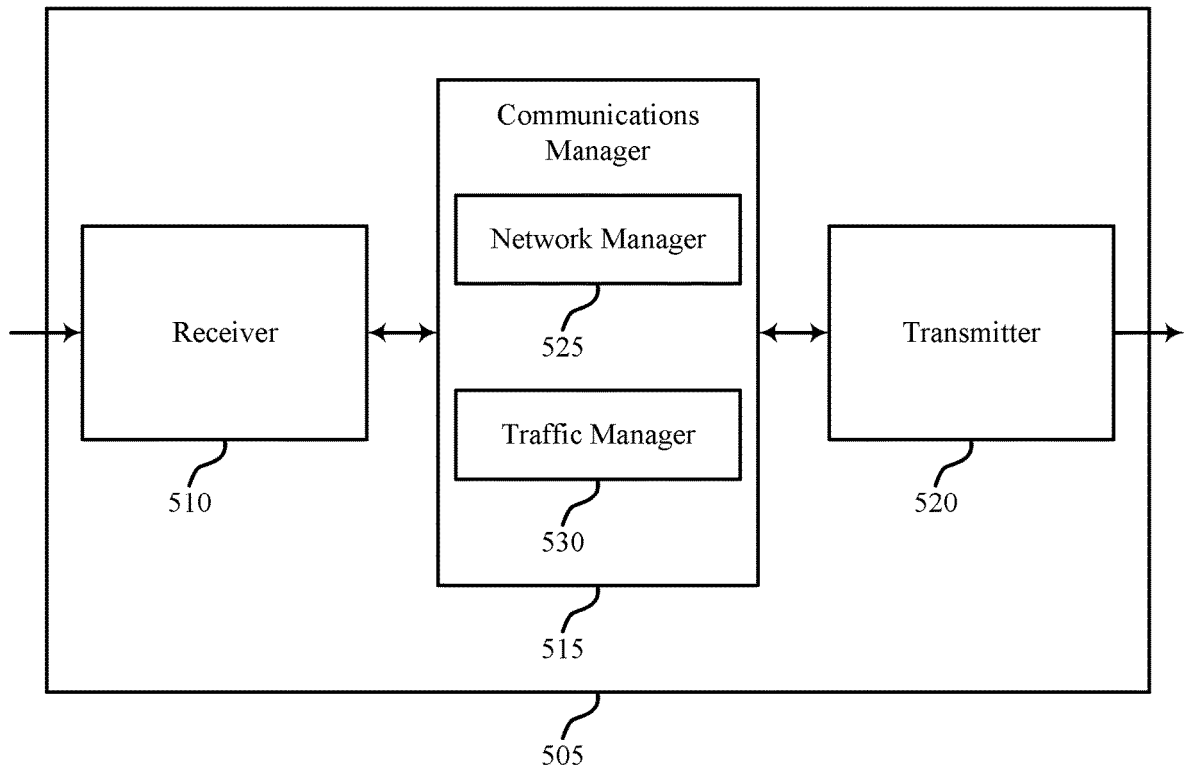

FIG. 5 shows a block diagram 500 of a device 505 that supports dedicated wireless network for security and automation system in accordance with aspects of the present disclosure. Device 505 may be an example of aspects of a device 405 or an automation and security system as described with reference to FIG. 4. Device 505 may include receiver 510, communications manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to dedicated wireless network for security and automation system, etc.). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the communications manager 715 described with reference to FIG. 7. Communications manager 515 may also include network manager 525 and traffic manager 530.

Network manager 525 may establish a first wireless network at a premise dedicated exclusively to communicate data of a security and automation system and refrain from scheduling communications for the security and automation system based on the network traffic parameter of the second wireless network satisfying a threshold.

Traffic manager 530 may identify a network traffic parameter of a second wireless network different from the first wireless network, the second wireless network located at the premise and configured to communicate data for remote computing devices associated with occupants of the premise.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
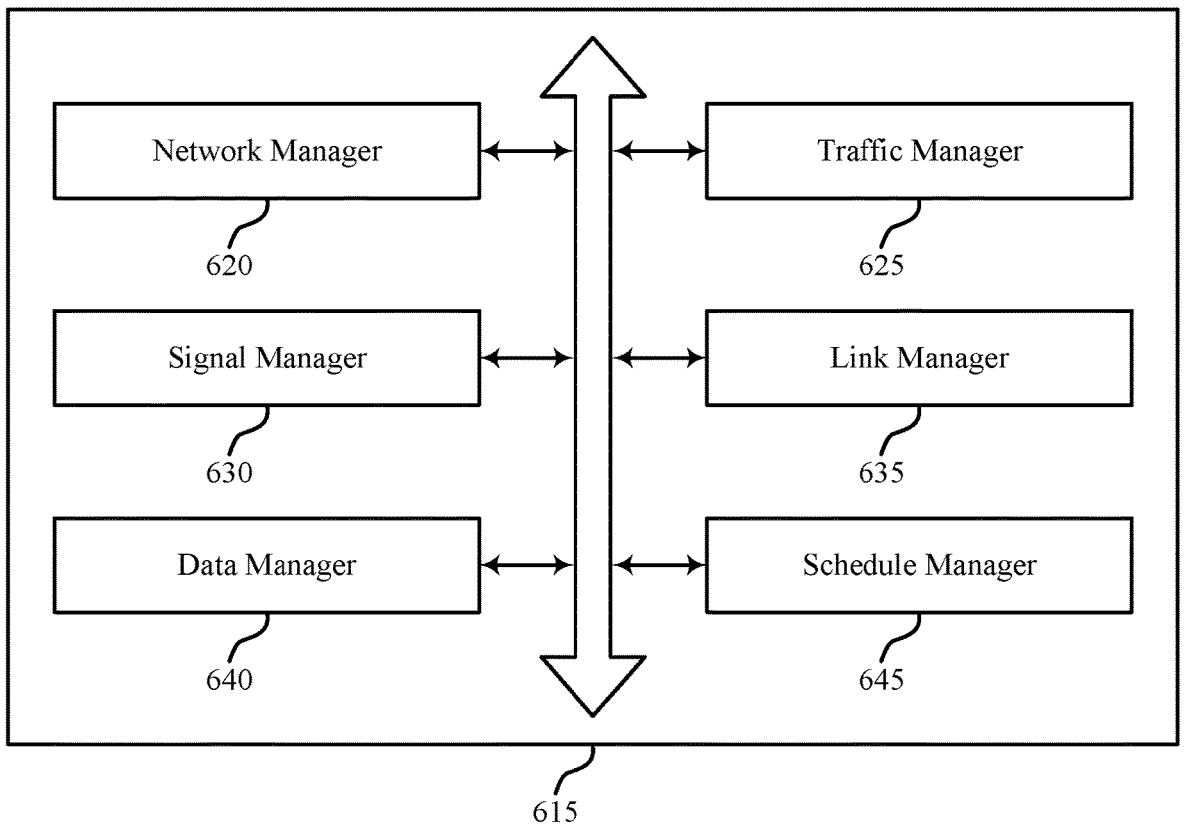

FIG. 6 shows a block diagram 600 of a communications manager 615 that supports dedicated wireless network for security and automation system in accordance with aspects of the present disclosure. The communications manager 615 may be an example of aspects of a communications manager 415, a communications manager 515, or a communications manager 715 described with reference to FIGS. 4, 5, and 7. The communications manager 615 may include network manager 620, traffic manager 625, signal manager 630, link manager 635, data manager 640, and schedule manager 645. Each of these modules may communicate, directly or indirectly, with one another (e.g., via one or more buses).

Network manager 620 may establish a first wireless network at a premise dedicated exclusively to communicate data of a security and automation system and refrain from scheduling communications for the security and automation system based on the network traffic parameter of the second wireless network satisfying a threshold.

Traffic manager 625 may identify a network traffic parameter of a second wireless network different from the first wireless network, the second wireless network located at the premise and configured to communicate data for remote computing devices associated with occupants of the premise.

Signal manager 630 may measure a signal parameter of a frequency spectrum band associated with the second wireless network, where identifying the network traffic parameter is based on the signal parameter.

Link manager 635 may receive a message from a second access point that establishes the second wireless network, the message including information about usage of the second wireless network, where identifying the network traffic parameter is based on the message and receive a scheduling request from a device of the security and automation system, the scheduling request including information regarding data to be transmitted from the device.

Data manager 640 may determine a type of the data to be transmitted based on the information included in the scheduling request, where refraining from scheduling communications is based on the type of the data.

Schedule manager 645 may identify a user-established time period associated with expected use of the second wireless network, where refraining from scheduling communications is based on the user-established time period.

Figure 7:
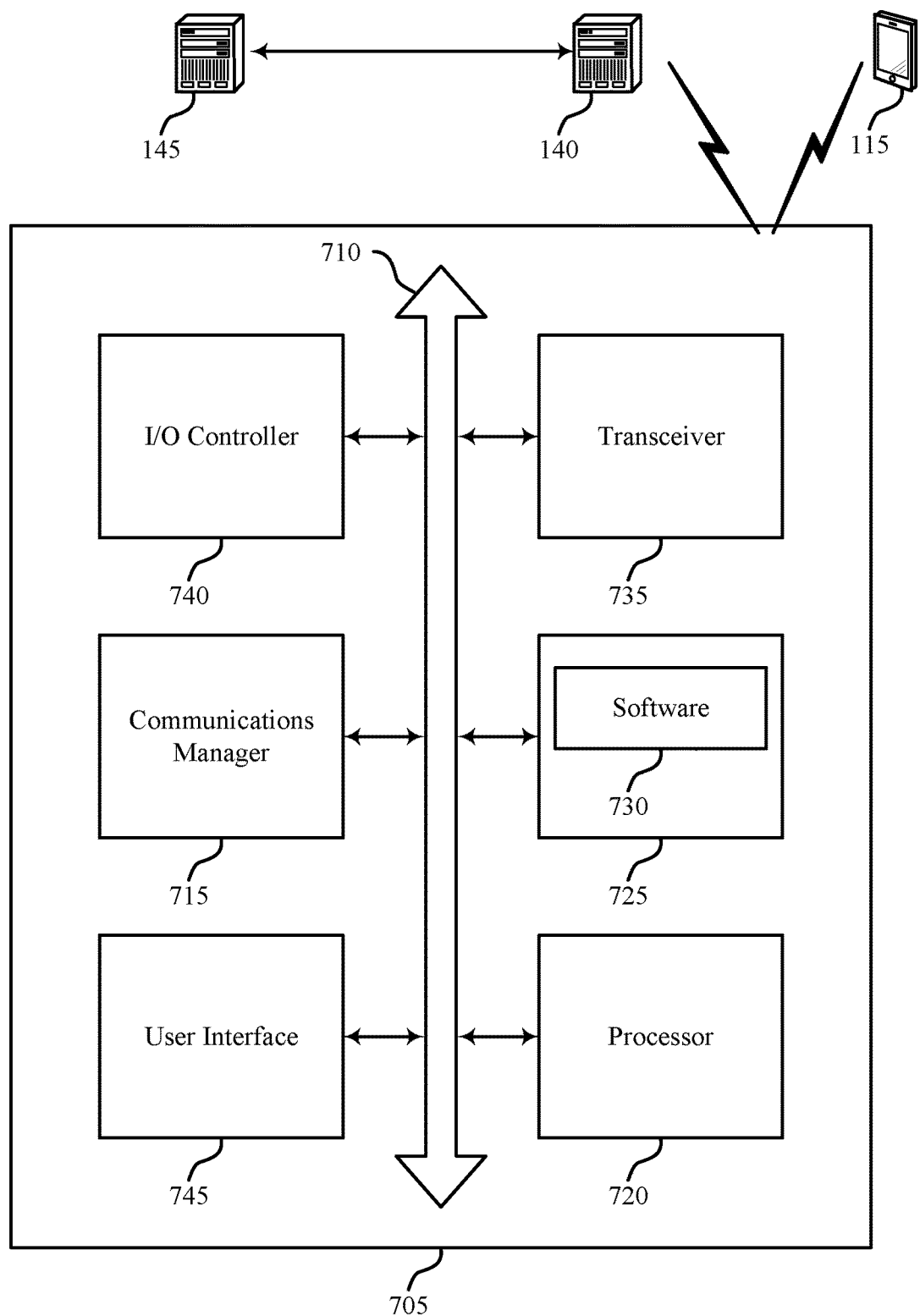
FIG. 7 illustrates a block diagram of a system including an automation and security system that supports dedicated wireless network for security and automation system in accordance with aspects of the present disclosure.

FIG. 7 shows a diagram of a system 700 including a device 705 that supports dedicated wireless network for security and automation system in accordance with aspects of the present disclosure. Device 705 may be an example of or include the components of device 405, device 505, or an automation and security system as described above, e.g., with reference to FIGS. 4 and 5. Device 705 may include components for bi-directional voice and data communications including components for transmitting and receiving communications, including communications manager 715, processor 720, memory 725, software 730, transceiver 735, I/O controller 740, and user interface 745. These components may be in electronic communication via one or more buses (e.g., bus 710).

In some cases, device 705 may communicate with a remote storage device and/or a remote server 155. For example, one or more elements of device 705 may provide a direct connection to a remote server 155 via a direct network link to the Internet via a POP (point of presence). In some embodiments, one element of device 705 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems may also be interconnected in different ways from that shown in FIG. 7. In some embodiments, an aspect of the operations of system 700 may be readily known in the art and are not discussed in detail in this disclosure.

The signals associated with system 700 may include wireless communication signals such as radio frequency, electromagnetics, LAN, WAN, VPN, wireless network (using 802.11, for example), 345 MHz, Z-WAVE®, cellular network (using 3G and/or Long Term Evolution (LTE), for example), and/or other signals. The RAT of system 700 may be related to, but are not limited to, wireless wide-area network (WWAN) (e.g, GSM, CDMA, and WCDMA), WLAN (including BLUE TOOTH® and Wi-Fi), WMAN (WiMAX), antennas for mobile communications, antennas for Wireless Personal Area Network (WPAN) applications (including radio frequency identification (RFID) and UWB). In some embodiments, one or more sensors (e.g., motion, proximity, smoke, light, glass break, door, window, carbon monoxide, and/or another sensor) may connect to some element of system 700 via a network using the one or more wired and/or wireless connections.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting dedicated wireless network for security and automation system).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support dedicated wireless network for security and automation system. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

User interface 745 may enable a user to interact with device 705. In some embodiments, the user interface module 745 may include an audio device, such as an external speaker system, an external display device such as a display screen, or an input device (e.g., remote control device interfaced with the user interface module 745 directly or through the I/O controller module).

Figure 8:
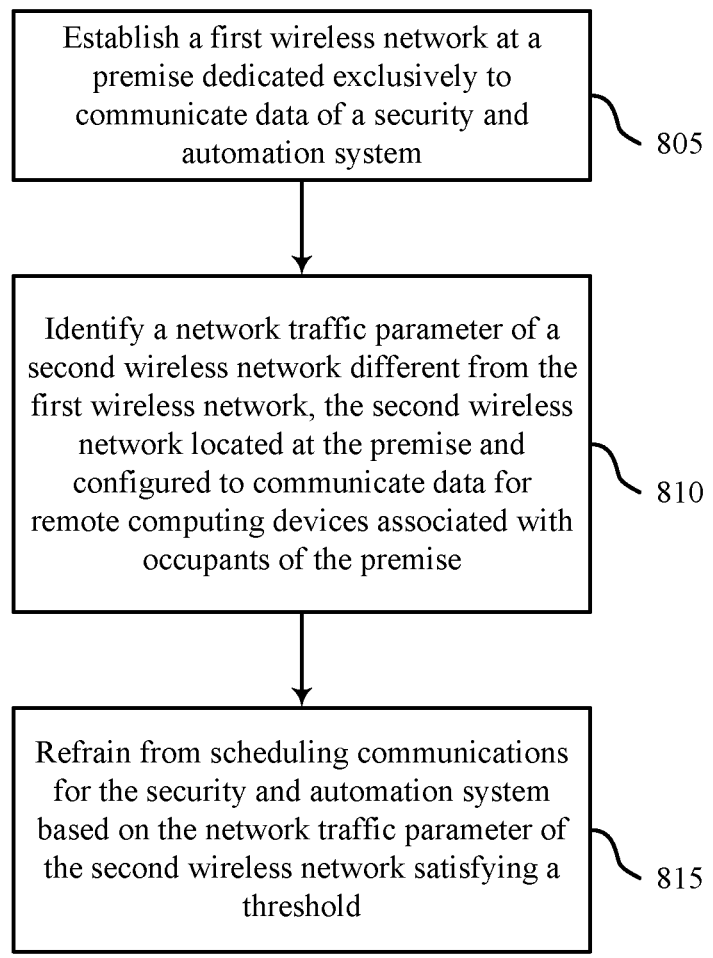
FIGS. 8 through 9 illustrate methods for dedicated wireless network for security and automation system in accordance with aspects of the present disclosure.

FIG. 8 shows a flowchart illustrating a method 800 for dedicated wireless network for security and automation system in accordance with aspects of the present disclosure. The operations of method 800 may be implemented by an automation and security system or its components as described herein. For example, the operations of method 800 may be performed by a communications manager as described with reference to FIGS. 4 through 7. In some examples, an automation and security system may execute a set of codes to control the functional elements of the device to perform the functions described below. Additionally or alternatively, the automation and security system may perform aspects of the functions described below using special-purpose hardware.

At block 805 the automation and security system may establish a first wireless network at a premise dedicated exclusively to communicate data of a security and automation system. The operations of block 805 may be performed according to the methods described herein. In certain examples, aspects of the operations of block 805 may be performed by a network manager as described with reference to FIGS. 4 through 7.

At block 810 the automation and security system may identify a network traffic parameter of a second wireless network different from the first wireless network, the second wireless network located at the premise and configured to communicate data for remote computing devices associated with occupants of the premise. The operations of block 810 may be performed according to the methods described herein. In certain examples, aspects of the operations of block 810 may be performed by a traffic manager as described with reference to FIGS. 4 through 7.

At block 815 the automation and security system may refrain from scheduling communications for the security and automation system based at least in part on the network traffic parameter of the second wireless network satisfying a threshold. The operations of block 815 may be performed according to the methods described herein. In certain examples, aspects of the operations of block 815 may be performed by a network manager as described with reference to FIGS. 4 through 7.

Figure 9:
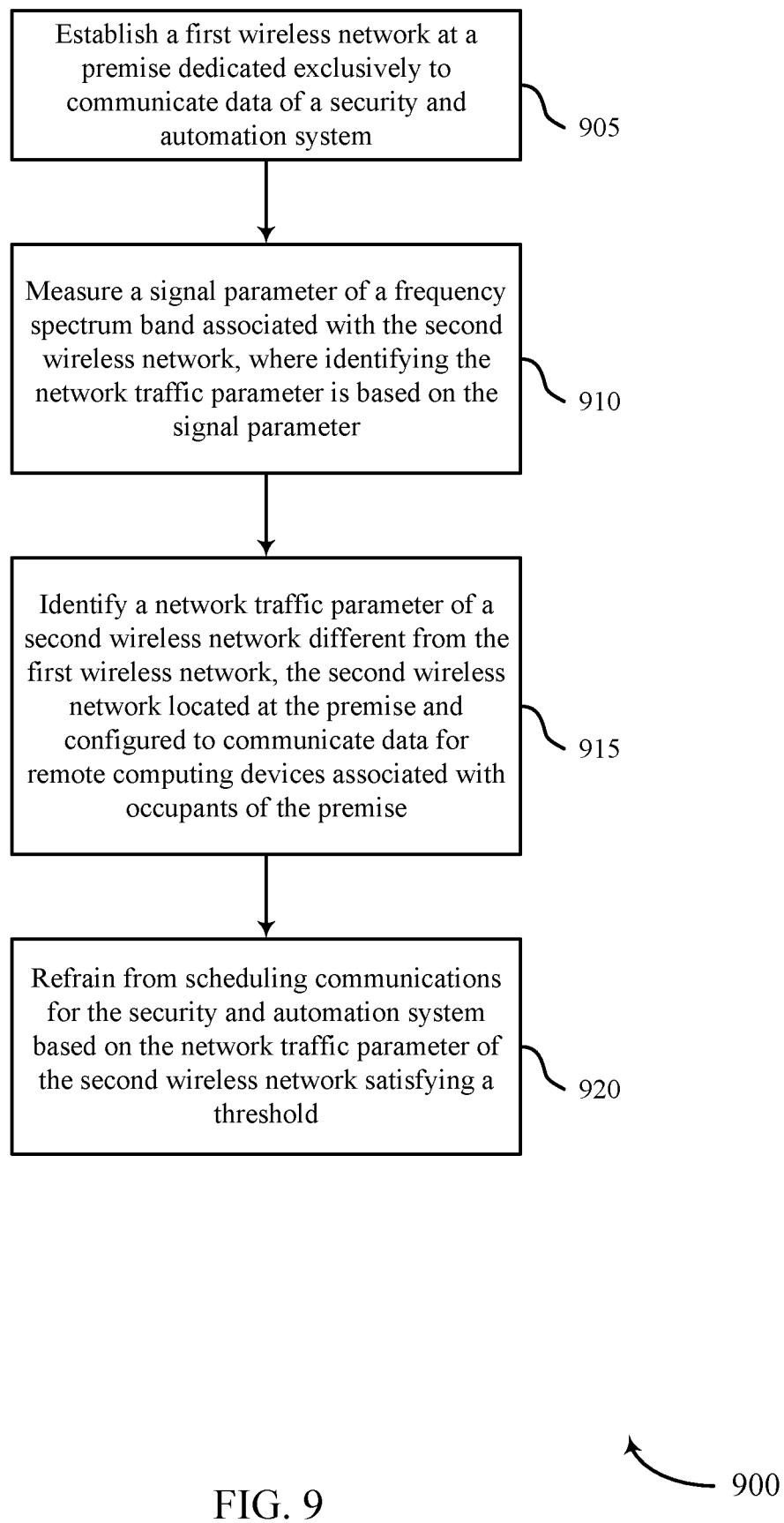

FIG. 9 shows a flowchart illustrating a method 900 for dedicated wireless network for security and automation system in accordance with aspects of the present disclosure. The operations of method 900 may be implemented by an automation and security system or its components as described herein. For example, the operations of method 900 may be performed by a communications manager as described with reference to FIGS. 4 through 7. In some examples, an automation and security system may execute a set of codes to control the functional elements of the device to perform the functions described below. Additionally or alternatively, the automation and security system may perform aspects of the functions described below using special-purpose hardware.

At block 905 the automation and security system may establish a first wireless network at a premise dedicated exclusively to communicate data of a security and automation system. The operations of block 905 may be performed according to the methods described herein. In certain examples, aspects of the operations of block 905 may be performed by a network manager as described with reference to FIGS. 4 through 7.

At block 910 the automation and security system may measure a signal parameter of a frequency spectrum band associated with the second wireless network, wherein identifying the network traffic parameter is based at least in part on the signal parameter. The operations of block 910 may be performed according to the methods described herein. In certain examples, aspects of the operations of block 910 may be performed by a signal manager as described with reference to FIGS. 4 through 7.

At block 915 the automation and security system may identify a network traffic parameter of a second wireless network different from the first wireless network, the second wireless network located at the premise and configured to communicate data for remote computing devices associated with occupants of the premise. The operations of block 915 may be performed according to the methods described herein. In certain examples, aspects of the operations of block 915 may be performed by a traffic manager as described with reference to FIGS. 4 through 7.

At block 920 the automation and security system may refrain from scheduling communications for the security and automation system based at least in part on the network traffic parameter of the second wireless network satisfying a threshold. The operations of block 920 may be performed according to the methods described herein. In certain examples, aspects of the operations of block 920 may be performed by a network manager as described with reference to FIGS. 4 through 7.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and automation system, comprising:
    establishing, at a first access point of the security and automation system, a first wireless network dedicated exclusively to communications of the security and automation system;
    determining a physical presence of a device of the security and automation system;
    authenticating the device based at least in part on the physical presence of the device;
    adding the device to a list of approved entities based at least in part on authenticating the device, wherein the list of approved entities comprises one or more devices permitted to establish communication links with the first access point; and
    establishing a communication link with the device based at least in part on adding the device to the list of approved entities.

2. The method of claim 1, wherein authenticating the device comprises:
    executing an authentication procedure based at least in part on near-field communications between the device and the first access point.

3. The method of claim 2, wherein the communication link with the device is established using the near-field communications.

4. The method of claim 1, further comprising:
    maintaining the list of approved entities at a control panel of the security and automation system.

5. The method of claim 1, wherein the first wireless network is invisible to the device before the device is added to the list of approved entities.

6. The method of claim 1, further comprising:
establishing, at a second access point of the security and automation system, a second wireless network different from the first wireless network, the second wireless network configured to communicate data for remote computing devices associated with users of the security and automation system.

7. The method of claim 6, further comprising:
identifying a network traffic parameter of the second wireless network; and
refraining from scheduling communications for the security and automation system based at least in part on the network traffic parameter of the second wireless network satisfying a threshold.

8. The method of claim 7, further comprising:
identifying a user-established time period associated with expected use of the second wireless network, wherein refraining from scheduling communications is based at least in part on the user-established time period.

9. The method of claim 6, wherein the first access point uses a first security protocol that is more strict than a second security protocol used by the second access point.

10. The method of claim 6, wherein the first access point is isolated from the second access point physically, electrically, communicatively, or any combination thereof.

11. The method of claim 1, further comprising:
receiving a scheduling request from the device, the scheduling request including information regarding data to be transmitted from the device; and
determining a type of the data to be transmitted based at least in part on the information included in the scheduling request.

12. A system for security and automation, comprising:
a processor;
memory in electronic communication with the processor; and
instructions stored in the memory and executable by the processor to cause the system to:
establish, at a first access point of the system, a first wireless network dedicated exclusively to communications of the system;
determine a physical presence of a device of the system;
authenticate the device based at least in part on the physical presence of the device;
add the device to a list of approved entities based at least in part on authenticating the device, wherein the list of approved entities comprises one or more devices permitted to establish communication links with the first access point; and
establish a communication link with the device based at least in part on adding the device to the list of approved entities.

13. The system of claim 12, wherein the instructions are further executable by the processor to cause the system to:
authenticate the device by executing an authentication procedure based at least in part on near-field communications between the device and the first access point.

14. The system of claim 13, wherein the communication link with the device is established using the near-field communications.

15. The system of claim 12, wherein the first wireless network is invisible to the device before the device is added to the list of approved entities.

16. The system of claim 12, wherein the instructions are further executable by the processor to cause the system to:
establish, at a second access point of the system, a second wireless network different from the first wireless network, the second wireless network configured to communicate data for remote computing devices associated with users of the system.

17. The system of claim 16, wherein the first access point uses a first security protocol that is more strict than a second security protocol used by the second access point.

18. The system of claim 16, wherein the first access point is isolated from the second access point physically, electrically, communicatively, or any combination thereof.

19. A non-transitory computer-readable medium storing computer-executable code for a security and automation system, the code executable by a processor to:
establish, at a first access point of the security and automation system, a first wireless network dedicated exclusively to communications of the system;
determine a physical presence of a device of the security and automation system;
authenticate the device based at least in part on the physical presence of the device;
add the device to a list of approved entities based at least in part on authenticating the device, wherein the list of approved entities comprises one or more devices permitted to establish communication links with the first access point; and
establish a communication link with the device based at least in part on adding the device to the list of approved entities.

20. The non-transitory computer-readable medium of claim 19, wherein the code is further executable by the processor to:
authenticate the device by executing an authentication procedure based at least in part on near-field communications between the device and the first access point.

* * * * *